United States Patent
Côté

(10) Patent No.: US 7,146,061 B2
(45) Date of Patent: *Dec. 5, 2006

(54) METHOD AND APPARATUS FOR ENCODING/DECODING IMAGE DATA

(75) Inventor: Pierre Côté, St-Charles-sur-Richellen (CA)

(73) Assignee: IQ Biometrix, Inc., Redwood Shores, CA (US)

( * ) Notice: Subject to any disclaimer, the term of this patent is extended or adjusted under 35 U.S.C. 154(b) by 462 days.

This patent is subject to a terminal disclaimer.

(21) Appl. No.: 10/699,681

(22) Filed: Nov. 4, 2003

(65) Prior Publication Data

US 2004/0091155 A1   May 13, 2004

Related U.S. Application Data

(63) Continuation of application No. 09/322,932, filed on May 28, 1999, now Pat. No. 6,690,830.

(51) Int. Cl.
   *G06K 9/36*   (2006.01)
(52) U.S. Cl. .................................. 382/284; 382/118
(58) Field of Classification Search ............... 382/115, 382/118, 308, 305, 284, 285; 345/676, 680, 345/530, 581; 707/103 R, 103 Y; 715/968
See application file for complete search history.

(56) References Cited

U.S. PATENT DOCUMENTS

| | | | |
|---|---|---|---|
| 5,214,758 A | 5/1993 | Ohba et al. .................. | 395/164 |
| 5,267,154 A | 11/1993 | Takeuchi et al. .......... | 364/419.2 |
| 5,375,195 A | 12/1994 | Johnston ..................... | 395/135 |
| 5,459,830 A | 10/1995 | Ohba et al. .................. | 395/152 |
| 5,537,662 A | 7/1996 | Sato et al. ................... | 395/135 |
| 5,563,992 A | 10/1996 | Murata et al. ............... | 395/135 |
| 5,600,767 A | 2/1997 | Kakiyama et al. .......... | 395/135 |
| 5,644,690 A | 7/1997 | Yoshino et al. ............. | 395/135 |
| 5,649,086 A | 7/1997 | Belfer et al. ................ | 395/141 |
| 5,680,531 A | 10/1997 | Litwinowicz et al. ....... | 395/173 |
| 6,381,346 B1 * | 4/2002 | Eraslan ....................... | 382/118 |
| 2003/0051255 A1 * | 3/2003 | Bulman et al. ............. | 725/135 |

\* cited by examiner

*Primary Examiner*—Von J. Couso
(74) *Attorney, Agent, or Firm*—Fleshner & Kim LLP

(57) ABSTRACT

The invention relates to a method and an apparatus for encoding images, more particularly to an encoding unit in conjunction with a library of pictorial entities and image qualifiers. The method and apparatus provide encoding an image by using a code factor table in conjunction with a set of element codes. The resulting image code allows the set pictorial elements of an image and their associated image qualifiers to be represented by a compact code uniquely representing a given configuration of pictorial elements. The use of the resulting image code facilitates the transmission and storage of images requiring only the code to be sent or stored. The invention further provides a computer readable medium comprising a program element that direct a computer to implement the encoding process.

24 Claims, 9 Drawing Sheets

METHOD AND APPARATUS FOR ENCODING/DECODING IMAGE DATA

CROSS-REFERENCE TO RELATED APPLICATIONS

This application is a continuation of U.S. application Ser. No. 09/322,932 and now U.S. Pat. No. 6,690,830, filed on May 28, 1999, the contents of which are incorporated herein by reference.

FIELD OF THE INVENTION

This invention relates to a method and apparatus for encoding/decoding image data. It is particularly applicable to the encoding/decoding of images that can be separated into their constituent parts as may be used in composite picture systems used in law enforcement, artistic creations, recreation and education.

BACKGROUND

It is known in the art to create images on the basis of components that are assembled to form a complete image. For example, a common technique for synthesizing single images of faces involves horizontally dividing the image of a face into bands for different features of the face such as hair, eyes, nose, mouth, and chin, respectively. Paper strips containing exemplary features are then be combined to form a composite drawing of a face. Yet another example involves a program element running on a computing platform which allows a user to select individual components and combining them on a pre-selected face. In a typical interaction, the user first selects the shape of the face then eyes, nose, mouth and other components and combines them to form a facial image. Many variations on this theme can be used as described in Kakiyama et al. U.S. Pat. No. 5,600,767, Yoshino et al. U.S. Pat. No. 5,644,690, Sato et al. U.S. Pat. No. 5,537,662 and Belfer et al. U.S. Pat. No. 5,649,096 whose contents are hereby incorporated by reference. For example, the Sato et al. Patent, entitled Electronic Montage composing apparatus, describes a system for creating a montage image of a face using a plurality of basic parts stored in a library.

In constructing an image, pictorial entities are selected from a library of pictorial entities as assembled into images. These images may then be stored on a computer readable medium commonly referred to as a database or repository. Often, the storage of an image requires significant amounts of memory, often necessitating large repositories. For example, a composite picture system used in a police department often requires maintaining records of thousands of individuals. The images are typically stored in files in some graphical format such as a "bitmap", "gif" or "jpeg" are other format. Although such encoding schemes provide a compressed representation of the image, the memory required for storing the image remains significant in addition, compression methods of the type described above generally degrade the quality of the image. The size and quality of images is also particularly significant when the images are transmitted from one site to another via a digital link. For example, a given police station may transmit a composite picture to another police station in order to share information about a given suspect.

Thus, there exists a need in the industry to refine the process of encoding images such as to reduce the memory requirements for storage and the bandwidth required for the transmission of the image.

SUMMARY OF THE INVENTION

The invention provides a novel method and an apparatus for encoding images.

For the purpose of the specification, the expression "basic elements" is used to describe a part of a specific image. In the preferred embodiment, a basic element is comprised or a pictorial entity conditioned by a set of image qualifiers. Examples of pictorial entities in a facial image are noses, eyes, mouths and eyebrows. In the preferred embodiment, pictorial entities are grouped into classes. For example, in composite picture system, all nose pictorial entities are grouped into the "NOSE" class and all the eye pictorial entities are grouped in the "EYE" class. Each class of pictorial entities is associated to a set of image qualifiers that are used to condition the pictorial entities in the associated class. The image qualifiers may include position qualifiers, zoom qualifiers, color qualifier and the likes.

For the purpose of this specification, the basic elements used in the special case of a facial image are referred to as "basic morphological elements".

For the purpose of this specification, the word "symbol" is used to designate a representation of an object, image, qualifier or the likes. In a specific example, a symbol may be an index mapped to a memory location storing data elements such as a pictorial entity or image qualifier.

According to a broad aspect, the invention provides, a computer readable storage medium comprising a program element suitable for use on a computer having a memory. The program element is operative to create a first input to receive a set of element codes. The element codes characterized a portion of an image and included at least one symbol. A given symbol is a representation of a certain characteristic of the portion of the element code. A given symbol can acquire a set of possible values indicative of variations of the certain characteristic with which it is associated. The program element is also operative to create a second input to receive code factors associated to respective symbols of the set of element codes. A given code factor is assigned a value that exceeds the highest value that the symbol with which it is associated can acquire. The program element is operative to process the set of element codes to derive an image code. The image code is a compressed digital representation of the image, and is derived at least in part on the basis of the plurality of code factors. The image code can then be released as the output.

In a preferred embodiment, the image code is a number in a given base. Preferably, a large base is used in order to obtain a reduced number of characters in the image code.

In a preferred embodiment of the invention, the encoding method and apparatus is integrated into a picture system. The picture system creates images on the basis of images of basic individual parts, herein referred to as basic elements. In the preferred embodiment, the picture system includes a library of pictorial entities and qualifiers, an image builder unit, an encoding unit, a decoding unit and a factor table.

Each basic element in an image is assigned a unique identifier, herein referred to as element code. The element code contains information data elements, herein referred to as symbols. In a specific embodiment, the element code for each basic element includes a symbol that characterizes the pictorial element. In a preferred embodiment, the element code includes a plurality if symbols In a specific example two (2) symbols are used namely an pictorial entity symbol and a position qualifier symbol. The element code may contain additional symbols without detracting from the spirit of the invention. For example symbols representative of other image qualifiers may be used such as color, zoom and other image effects may be used. An image is constructed by a set of basic elements. The basic elements present in a given facial image are said be "active" in the given image. The set of active elements is stored in a data structure suitable for that purpose. In a specific example this data structure is an image data table. The image data table stores for each class a record, each record containing a set of fields, each field describing the active pictorial entity and qualifiers.

The number variations in each of the symbols for each of the classes is stored in a table, herein referred to as a code factor table. The code factor table provides information about the number of possible variations in an image. For each class, the code factor table stores a record, each record containing a set of fields, each field describing a maximum factor. The maximum factor in the code factor table is the largest identifier used for the given factor. Each symbol in the image data table is mapped to a factor in the code factor table.

According to another broad aspect, the invention provides an apparatus for encoding an image, the image comprising a set or basic elements, each basic element of the set of basic elements being associated to an element code. An encoding unit receiving as input the code factors and the element codes. The encoding unit processes the set of element codes to derive an image code, the image code being a compressed digital representation of the image derived at least in part on the basis of said plurality of code factors. The encoding unit then outputs the image code.

According to another broad aspect, the invention provides a method for encoding an image, the image comprising a set of basic elements, each basic element of the set of basic elements being associated to an element code. A processing step receives as input the code factors and the element codes to derive an image code. The image code is a compressed digital representation of the image derived at least in part on the basis of said plurality of code factors. The image code is the released.

In a preferred embodiment, the image code can be used to reproduce the image described by the image code. Image data may be obtained by combining the code factors and the image code with a decoding device. The image data is obtained by applying the inverse operations in the reverse order than those applied in the encoding process to the image code.

The image code allows each image to be described with a very small number of characters permitting the rapid transmission of the image over a data transmission medium. The receiving device has a decoding unit that is capable of extracting data information from the image code.

According to another broad aspect, the invention provides a method, apparatus and computer readable medium for decoding an image, the image comprising a set of basic elements, each basic element of the set of basic elements being associated to an element code. A processing step receives as input the code factors and the image code to derive the element codes. The element codes are then released.

BRIEF DESCRIPTION OF THE DRAWINGS

These and other features of the present invention will become apparent from the following detailed description considered in connection with the accompanying drawings. It is to be understood, however, that the drawings are designed for purposes of illustration only and not as a definition of the limits of the invention for which reference should be made to the appending claims.

DETAILED DESCRIPTION

In the preferred embodiment, the encoding method and apparatus in accordance with the invention is integrated into a picture system or creating images on the basis of images of individual parts, herein referred to as basic elements. For the sake of simplicity, the specification will describe an embodiment of the invention integrated into a composite picture system. It is to be understood that the encoding method and apparatus may be used in systems for creating images on the basis of individual constituent parts other than a composite picture system without detracting from the spirit of the invention.

Figure 1:
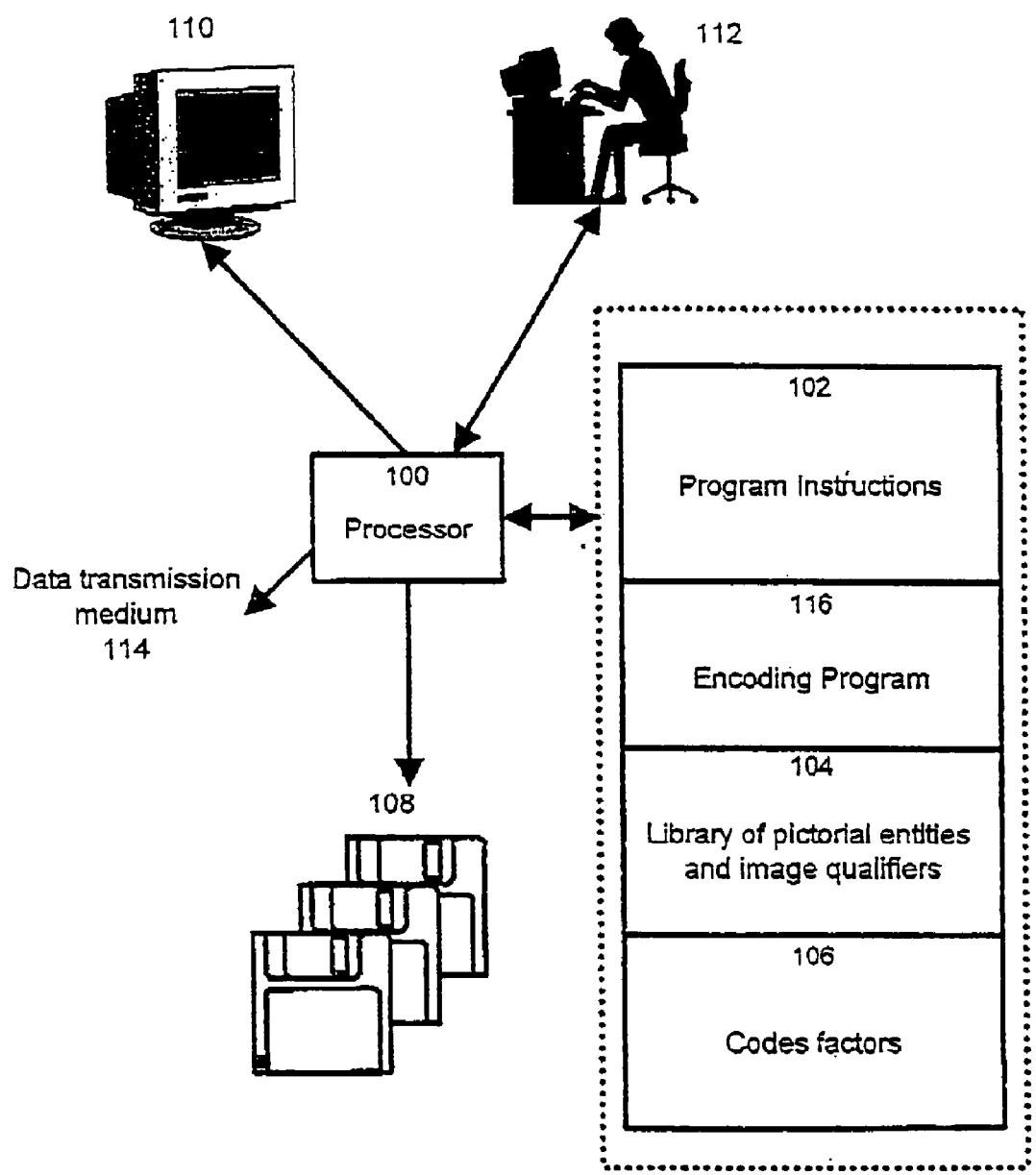
FIG. 1 shows an apparatus including an embodiment of the invention.

In a preferred embodiment, as shown in FIG. 1, the composite picture system includes a general-purpose digital computer including a processor 100 linked to a machine-readable storage element 108 that may be in the form of a mass storage device such as a hard-drive, a CD-ROM or any other suitable storage medium. The system further includes a device for visualizing the facial image such as a computer monitor 110 or a printing device. The preferred embodiment also provides data input on which a user interface 112 is supported in order to allow the user to select through a touch screen, keyboard, pointing device or other input means, the individual basic morphological elements and to view the combined result on the display screen 110. The latter 110 is likely to be part of the data input. Optionally, the system further provides a data transmission medium 114 such as a telephone line, LAN, digital cable, optical cable, wireless transmission device or any other suitable means for transmitting an image from the general purpose digital computer to a receiving device. The computer readable medium 108 storing the composite picture system includes of a set of modules namely a library of pictorial entities and image qualifiers 104 and program instructions 102 interacting with the library of pictorial entities and image qualifiers to create a facial image. The computer readable medium 108 may also include symbols where each symbol is associated to a respective one of the pictorial entities and image qualifiers in the library of pictorial entities and image qualifiers 104. The computer readable medium further comprising a set of code factors, each code factor being associated to a set of symbols, a given code factor being larger that the largest symbol in the set with which it is associated. The computer readable medium further comprises an encoding program element 116 to encode a facial image.

In the preferred embodiment the composite picture system comprises an electronic library of pictorial entities and image qualifiers 104. Each pictorial entity in the library is an image of a facial part or an accessory such as glasses, earrings or other. The pictorial entities in the library 104 are organized into morphological classes, each class describing a part of the face. In a preferred embodiment, the following basic morphological classes are used: hairstyle, forehead, eyebrows, eyes, nose, mouth, chin, moustache, beard, wrinkles and glasses. The pictorial entities are stored on a computer readable medium. The images may be compressed in a format suitable for graphical storage such as a bitmap (BMP), GIF of JPEG file format. Other file formats may be used here without detracting from the spirit of the invention.

In the preferred embodiment, each pictorial entity is identified with a pictorial entity symbol. Typically, the pictorial entity symbol is a sequence of alphanumeric characters. The pictorial entity symbols are stored on a computer readable medium in the database of symbols. Each image qualifier in the library is a characteristic of a corresponding class. The image qualifiers in the library 104 may be organized into qualifier types, each qualifier type describing a certain characteristic of the pictorial entity. In a preferred embodiment, the following qualifier types are used: position and color. Other image qualifiers such as zoom and the likes may be used without detracting from the spirit of the invention. The image qualifiers are stored on a computer readable medium. In the preferred embodiment, each image qualifier is identified with an image qualifier symbol. Typically, the image qualifier symbol is a sequence of alphanumeric characters. The image qualifier symbols are stored on a computer readable medium in the database of symbols.

In a preferred embodiment, a basic morphological element includes a pictorial entity and a set of image qualifiers. The image qualifiers condition the pictorial entity to alter the visual effect of the latter. For example the image qualifier may modify the position, color zoom or any other visual effect of the pictorial entity. The purpose of the specification, the expression "basic morphological element" is used to refer to the pictorial entity conditioned by the image qualifiers. Each basic morphological element is associated to an element code. The element code contains a set of symbols. In a specific example, the element code for each basic morphological element includes two (2) symbols namely a pictorial entity symbol and a position qualifier symbol. The pictorial entity symbol identifies the pictorial entity within a given class in the library of pictorial entities and image qualifiers. Preferably, the pictorial entities of a given class are each assigned a unique symbol. The symbols need not be consecutive provided they can be ordered and the largest symbol assigned to a pictorial entity of a given class can be determined. The position qualifier symbol provides information on the position of the pictorial entity in the facial image. Preferably, the number of possible positions for a pictorial entity of a given class is predetermined. In a specific example, there may be 5 possible positions for the eyes in a facial image. Each position is assigned a position qualifier symbol such as a number from 1 to 5 and each position qualifier symbol corresponds to a position the pictorial entity with which it is associated can acquire. The element code may contain additional symbols without detracting from the spirit of the invention. For example, the element code may contain a "zoom" qualifier indicating the zoom level of the pictorial entity.

A facial image is constructed by a set of basic morphological elements. The basic morphological element present in a given facial image is said be "active" in the given image. The set of active basic morphological elements is stored in a data structure suitable for that purpose. In a specific example this data structure is an image data table. The image data table stores for each class a record. Each records describes an element code, each record containing a set of fields, each field describing the pictorial entity symbol, position qualifier symbol and any other symbol. The entries in the image data table are referred to as active element symbols. The table below shows a specific example of an image data table.

| Class | Pictorial entity symbol | Position qualifier symbol |
|---|---|---|
| EYES | 34 | 2 |
| LIPS | 2 | 1 |
| GLASSES | 111 | 17 |

As shown above, a basic morphological element of class "EYES" with a pictorial entity symbol "34" which is positioned at position "2" is active in the facial image.

The number variations in each of the symbols for each of the classes is stored in a table, herein referred to as a code factor table. The code factor table provides information about the number of possible variations in a facial image. For each class, the code factor table stores a record, each record containing a set of fields, each field describing a maximum factor. The maximum factor in the code factor table is the largest symbol assigned to an image qualifier or pictorial entity for a given class. Alternatively, the maximum factor is larger that the largest symbol assigned to an image qualifier or pictorial entity for a given class. This will best be understood in conjunction with a specific example. The table below shows an example of a code factor table.

| Class | Maximum pictorial entity factor | Maximum position qualifier factor |
|---|---|---|
| EYES | 900 | 5 |
| LIPS | 600 | 26 |
| GLASSES | 200 | 23 |

In the above table, there are three classes namely "EYES", "LIPS" and "GLASSES" having "900", "600" and "200" pictorial entities respectively as their maximum factor. In this specific example, the pictorial entities are assigned numerical symbols no larger that the maximum factor for each respective class. In the case where pictorial entities are not assigned consecutive numerical symbols, the second column would contain the largest pictorial entity symbol assigned to the pictorial entities of the respective class. The third column includes the maximum position qualifier factor. Class "LIPS" for example has "26" as is maximum position qualifier factor. In this specific example, positions for the individual pictorial entities are pre-determined. Each pre-determined position is given a numerical position symbol that is between 1 and the maximum position qualifier factor in the code factor table.

Figure 2:
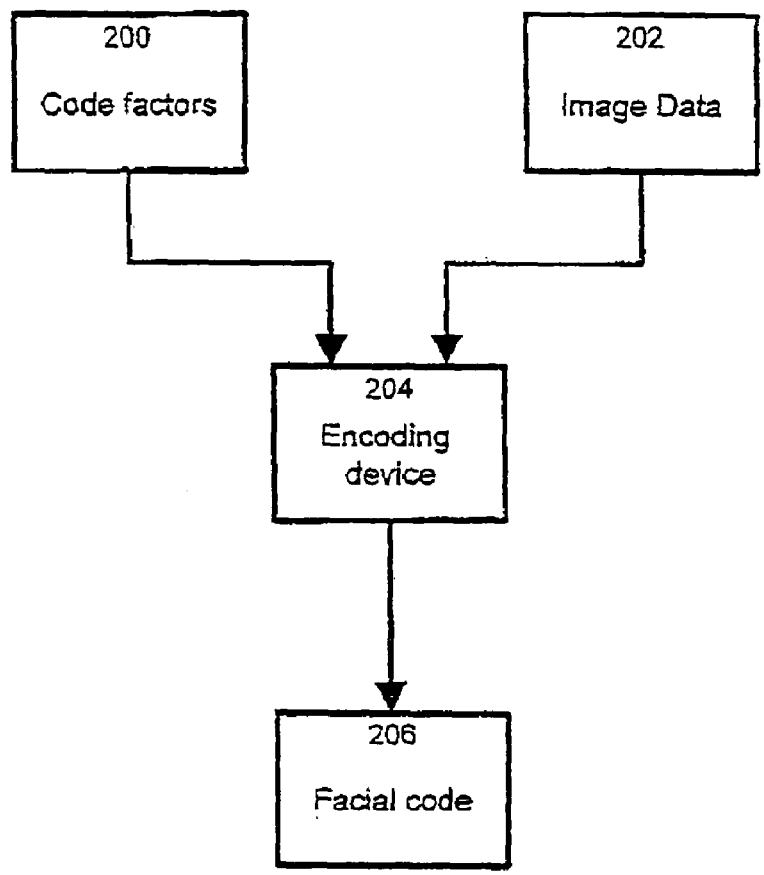
FIG. 2 shows a high-level block diagram of functional units of the image system including an image encoder in accordance with the spirit of the invention.
Figure 4:
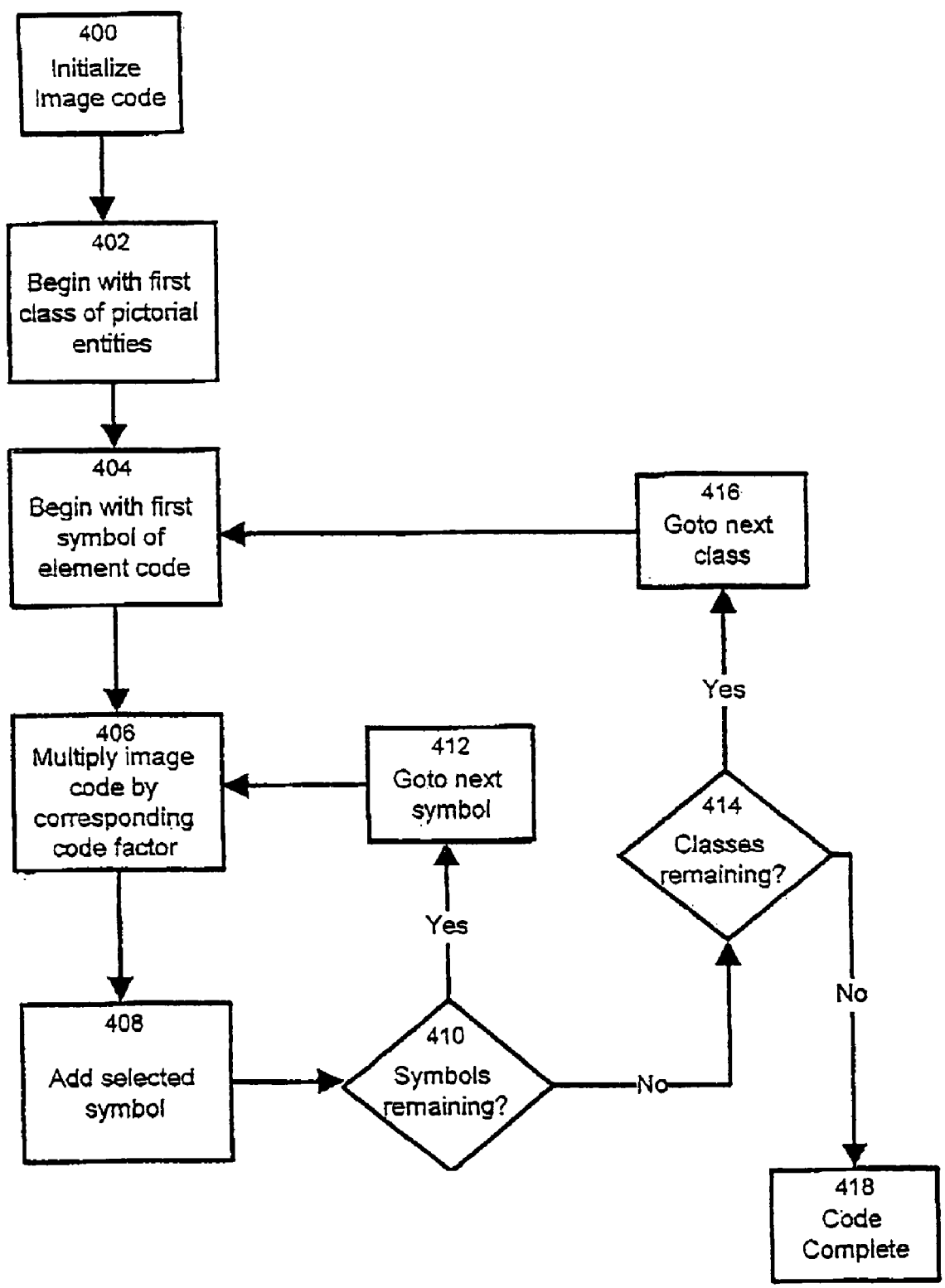
FIG. 4 shows a detailed block diagram of the encoding process in accordance with the spirit of the invention.

As shown in FIG. 2, a facial code 206 for a given facial image may be created by combining the code factors 200 and the image data 202 with an encoding device 204. In a preferred embodiment, the encoding device 204 derives the facial code in accordance with the process described in FIG. 4.

The facial code is first initialized at a based value 400. Preferably, this base value is zero (0). Following this, the encoding method begins with the first class of the pictorial entities 402 and the first symbol of the element code of the class 404. The facial code is first multiplied 406 by the corresponding factor value in the code factor table. An example in conjunction with the factor table below will better illustrate this step 406.

| Class | Maximum pictorial entity factor | Maximum position qualifier factor |
|---|---|---|
| EYES | 900 | 5 |
| LIPS | 600 | 26 |
| GLASSES | 200 | 23 |

If class "EYES" for the pictorial entity is being considered, then the facial code is multiplied by the pictorial entity factor "900". Following this, the pictorial entity symbol from the image data table is added 408 to the facial code. An example in conjunction with the image data table below will better illustrate this step 408.

| Class | Pictorial entity symbol | Position qualifier symbol |
|---|---|---|
| EYES | 34 | 2 |
| LIPS | 2 | 1 |
| GLASSES | 111 | 17 |

If class "EYES" for pictorial entity is being considered, then the pictorial entity symbol "34" is added to the facial code. The system then proceeds to step 410 that checks if there are any symbols remaining for the current class. In the affirmative, the system proceeds to step 412 that determines which symbol to consider next. In the example above, the following symbol to consider is the position qualifier symbol. The system then restarts at step 406. In the event that all symbols for the current class have been processed, step 410 is answered in the negative and the system proceeds to step 414. Step 414 checks if there are any classes remaining. In the affirmative the system proceeds to step 416 that determines which class to consider next. In the example above, the next class to consider is the "LIPS" class. The system then restarts at step 404 with the first symbol of the element code of the new class. In the event that all classes have been processed, step 414 is answered in the negative and the system proceeds to step 418 with the complete facial code.

As a variant, the facial code may be further comprise version number information for the purpose of differentiating between different version numbers of the composite picture system. This in turn permits to insure that a composite picture system using the facial code produced by the process described above is not induced in error if its version is not the same than that of the composite picture system that created the image. In a specific example, the version number information is integrated to the facial code by multiplying the code by a specific number.

In the preferred embodiment, the facial code is a number in a given base. Preferably, a large base is used in order to obtain a reduced number of characters in the facial code. In a specific example, the facial code is a number in base "62" with characters {0–9, a–z, A–Z}. Other bases may be used without detracting from the spirit of the invention. It is to be noted that the computations in steps 406 and 408 of the encoding process may result in very large numbers in the order of 10E+66 or bigger for large systems. It may therefore be preferable to provide some specialized functions for the computation of the multiplication and addition operations for these numbers in order to avoid the possibility of overflow. The implementation of such computations will be readily available to the person skilled in the art to which this invention pertains.

As a variant, characters in the facial code that may be visually confusing are replaced by non-alphanumeric characters. For instance the letter "O" and the number "0" are similar in appearance as are the letter "I", the letter "l" and the digit "1". In a specific example, the characters in the facial code that may be visually confusing are replaced by non-alphanumeric characters such as "+", "=", "@" and so once the code is computed.

Figure 3:
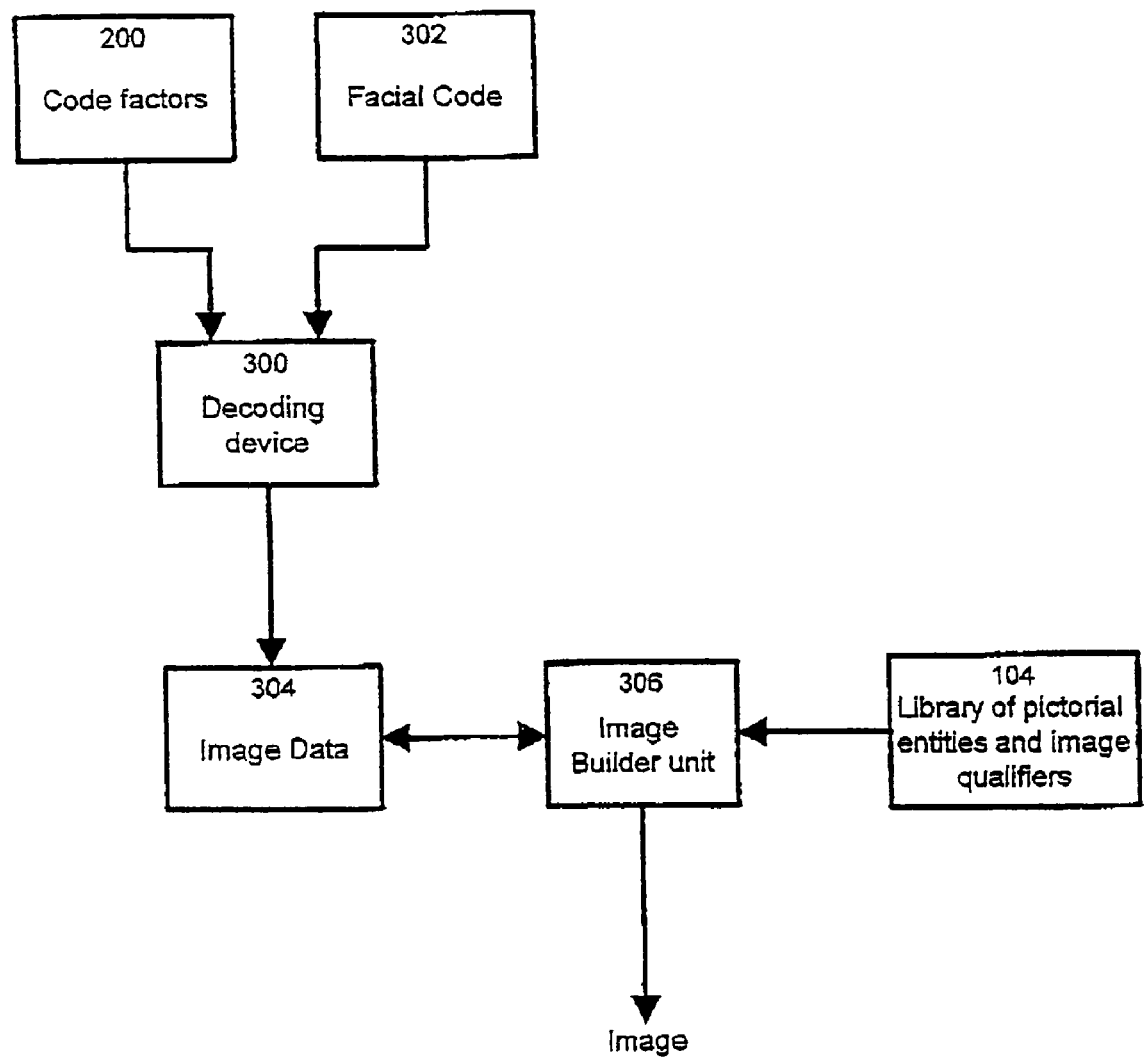
FIG. 3 shows a high-level block diagram of functional units of the image system including an image decoder in accordance with the spirit of the invention.
Figure 5:
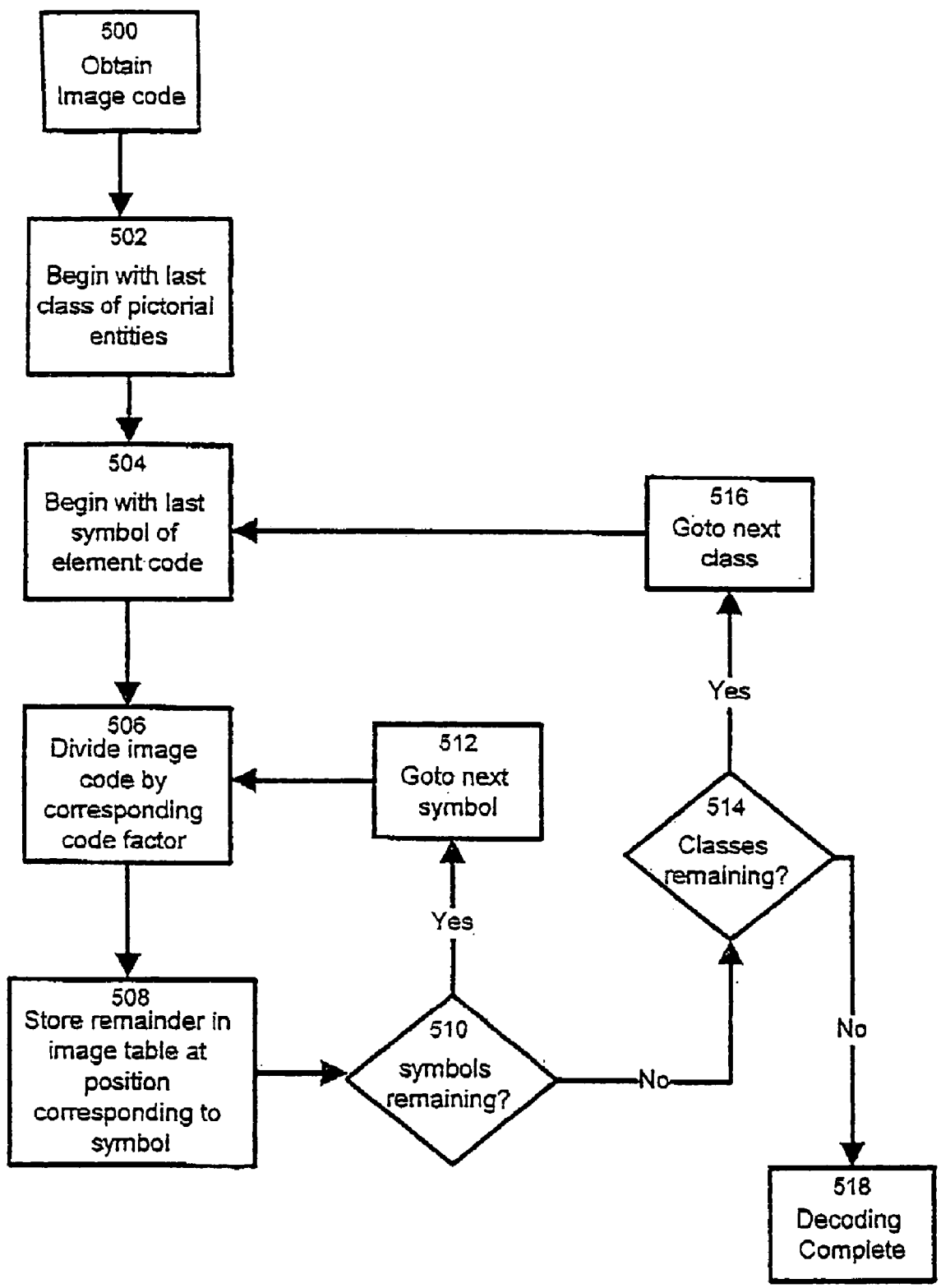
FIG. 5 shows a detailed block diagram of the decoding process in accordance with the spirit of the invention.

In a preferred embodiment, the facial code can be used to reproduce the facial image described by the facial code. As shown in FIG. 3, facial image data 304 may be obtained by combining the code factors 200 and the facial code 302 with a decoding device 300. The facial image data 304 is obtained by applying the inverse operations in the reverse order than those applied in the encoding process to the facial code. In a preferred embodiment, the decoding device 300 derives the facial image data 804 in accordance with the process described in FIG. 5.

The facial code is first obtained 500. Following this, the decoding process begins with the last class of the pictorial entities 502 and the last symbol of the element code of that class 504. The facial code is first divided 506 by the factor value in the code factor table associated to the symbol being considered. An example in conjunction with the factor table below will better illustrate this step 506.

| Class | Maximum pictorial entity factor | Maximum position qualifier factor |
|---|---|---|
| EYES | 900 | 5 |
| LIPS | 600 | 26 |
| GLASSES | 200 | 23 |

If class "GLASSES" for the position qualifier is being considered, then the facial code is divided by the factor "23". Following this, the remainder of the division performed in step 506 is stored as the corresponding position qualifier symbol in the image data table 508. The system then proceeds to step 510 that checks if there are any symbols remaining for the current class. In the affirmative, the system proceeds to step 512 that determines which symbol to consider next. In the example above, the following symbol to consider is the pictorial entity symbol. The system then restarts at step 506. In the event that all symbols for the current class have been processed, step 510 is answered in the negative and the system proceeds to step 514. Step 514 checks if there are any classes remaining. In the affirmative the system proceeds to step 516 that determines which class to consider next. In the example above, the next class to consider is the "LIPS" class. The system then restarts at step 504 with the last symbol of the element code of the new class. In the event that all classes have been processed, step 514 is answered in the negative and the system proceeds to step 518 with the image data table including the complete description of the image described by the facial code. The image data table can then be used by the composite picture system to access the library of pictorial entities and image qualifiers 104 and produce a facial image.

As shown in FIG. 3, the image data 304 is stored in an image data table that can be accessed by an image builder unit 306. The image builder unit 306 accesses the library of pictorial entities and image qualifiers 104 of the composite picture system to extract the pictorial entities specified by the image data. The image builder also extracts the image qualifiers specified by the image data and is operative to condition the pictorial entities on the basis of the these extracted image qualifiers. Following this the builder unit 300 outputs an image which may be displayed to the user of the composite picture system. Extracting data elements from a database on the basis of symbols is well known in the art to which this invention pertains.

In the event that the facial code comprises version number information, the reverse operation used to imbed the version number in the facial code is applied to the facial code during the decoding process. In a specific example where the version number information is integrated in the facial code by multiplying the code by a specific number, the decoding process involves dividing the facial code by that number.

In the event that characters in the facial code that may be visually confusing were replaced by non-alphanumeric characters, the reverse operation is performed on the facial code.

An example of a typical interaction will better illustrate the functionality of the encoding module implemented by the program instructions 102 of composite picture system and using the data components 104 106.

Figure 6A:
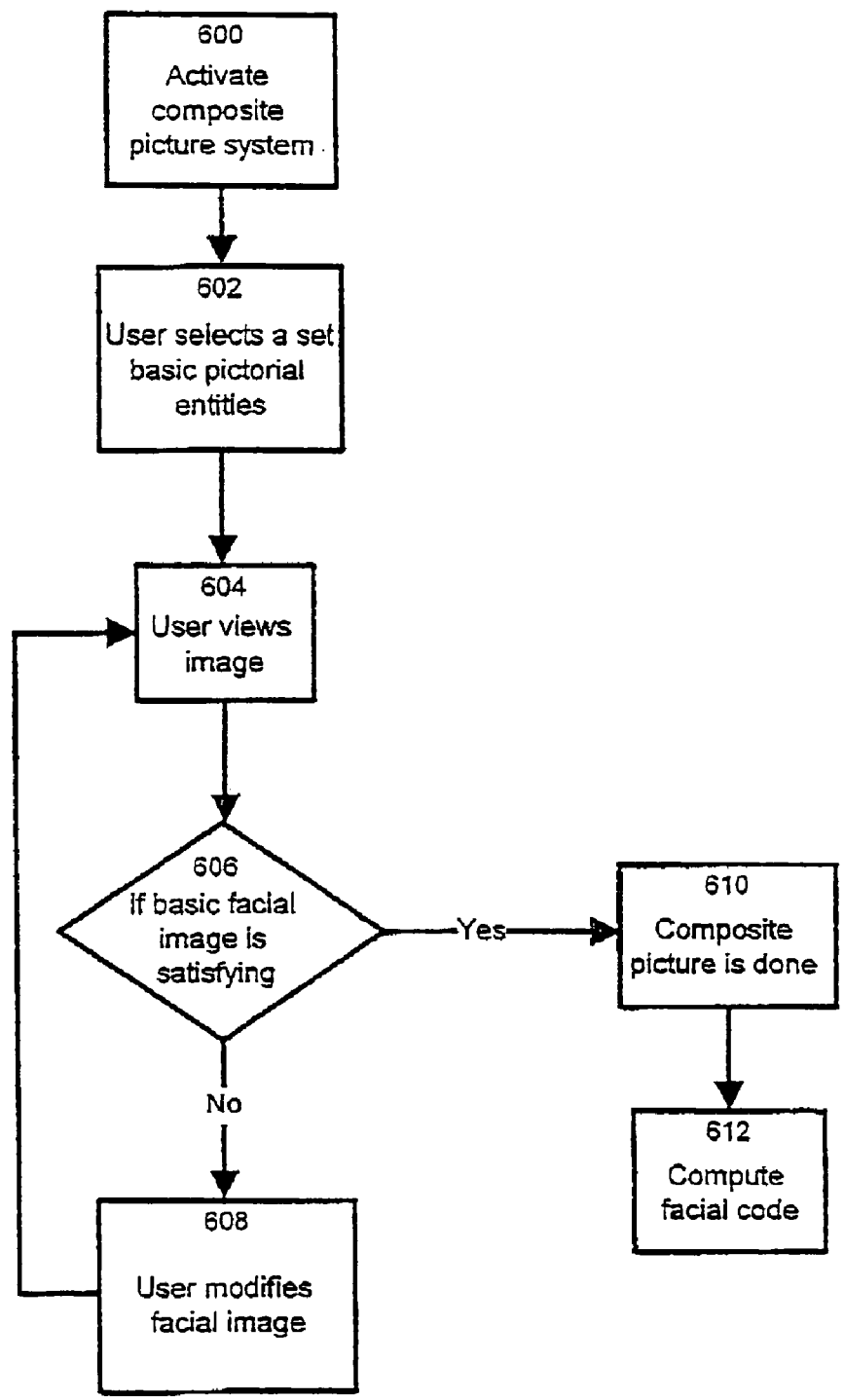
FIGS. 6*a* and 6*b* show flow diagrams for the creation of an image and the facial code in accordance with an embodiment of the invention.

In a typical interaction, as shown in FIG. 6a, once the composite picture system is activated 600, the user selects a set of pictorial entities 602 through a user interface. The interface to the composite picture system may be a keyboard, pointing device, touch screen or any other suitable input means. The received input may be an address of the memory location where a given pictorial entity is located or some other way of identifying it. The selection is entered in the image data table in association with corresponding qualifier symbols. Preferably, the pictorial entities in a given class as assigned default qualifier symbols. Once the system has received the request, the entries in the image data table are used to locate in the library of pictorial entities and image qualifiers, the entries corresponding with the received input. When pictorial entity or image qualifier is selected it is considered to be active. Following this, the selected pictorial entities and image qualifiers are combined to form a facial image. The combination is performed by positioning each active pictorial entity in a same frame at the location specified by the position qualifier in the image data table. The system then displays the facial image to allow the user to view it 604. Alternatively, after each selection of a pictorial entity, the systems displays it to allow the user to view the image as it stands with the current selection of pictorial entities. At condition 606, if the user is satisfied with the appearance of the facial image, the composite picture is complete 610. The completeness of the image may be indicated by a user inputting a command indicative that the image is complete. The image data table is then processed by the encoding process to compute the facial code 612. The user of the system may then make use of the facial image and facial code as he pleases. For example, the user may print the resulting facial image, he may store the image by storing the facial code computed at step 612 or he may transmit the image to an external site by transmitting the facial code. In the event that the user is not satisfied with the appearance of the facial image, condition 606 is answered in the negative and the user may modify the facial image 606. The modification of the facial image may comprise different operations. For example, the user may replace a pictorial entity by another of the same class; he may remove a pictorial entity all together; the element may be displaced in the vertical or horizontal direction. In a specific example, the user interface may include a means, such as arrows in the user interface, for displacing the pictorial entities in the vertical and horizontal directions. The arrows may be linked to functional modules that modify the position of the selected image in the screen. When the pictorial entity is displaced, the corresponding position qualifier symbol in the image table is also modified such as to reflect to current positioning of the pictorial entity. The user may select via a pointing device or other input means the element he wishes to displace in the facial image. The user then uses the displacement arrows to position the pictorial entity in the desired position in the facial image. Many variations in the user interface are possible and implementations different from the one presented above do not detract from the spirit of the invention. For every modification performed in step 608, the image data table is updated accordingly. Once the facial image has been modified by selecting a revised set of pictorial entities and image qualifiers, the latter are combined to form a facial image. The system then displays the facial image as described in the image data table to allow the user to view it at step 604. Alternatively, after each selection of a pictorial entity or and image qualifier, the systems displays it to allow the user to view the updated image as it stands with the current selection. The process continues until the user is satisfied with the image and condition 606 is answered in the affirmative the system proceeds to step 610.

Figure 6B:
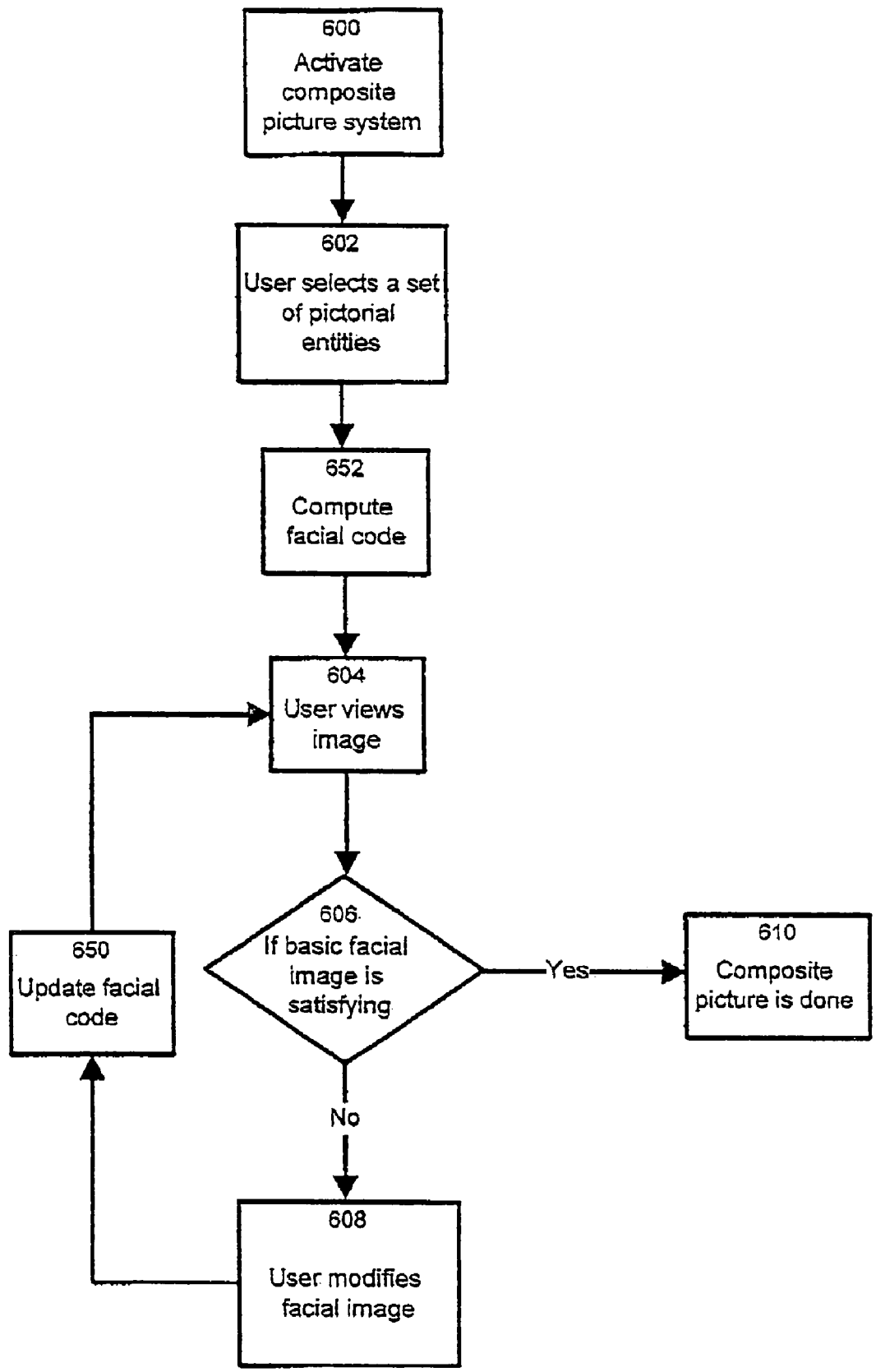

As a variant, as shown in FIG. 6b, the facial code may be computed incrementally as the user selects pictorial entities and image qualifiers and modifies the facial image. Following step 602, the image data table is processed 652 by the encoding unit to compute the facial code corresponding to the data in the image data table. The facial image may then be modified in accordance with steps 604 606 and 608 described previously. Following step 608, the image data table is reprocessed by the encoding unit 650 to compute the facial code corresponding to the updated data in the image data table. In this variant, the facial code for the image being created is computed as the user creates the image. Once the use stops entering new modifications, the code is readily computed without the need for the user to input a command indicative that the image is complete.

In another typical interaction, the composite picture system may receive as input the facial code describing a facial image. Using this facial code, the composite picture system reconstructs the facial image. Therefore; the user interface may also include a means for entering the facial codes. The facial code is first decoded by the process described in connection with FIG. 5. The decoding process produces an image data table containing information for generating the facial image. The system accesses the library of pictorial entities and image qualifiers and extracts the pictorial entities and image qualifiers corresponding to the data contained in the image data table. The image is then displayed to the user which may make use of it as he please by modifying it, storing it, printing it or transmitting it.

Figure 7:
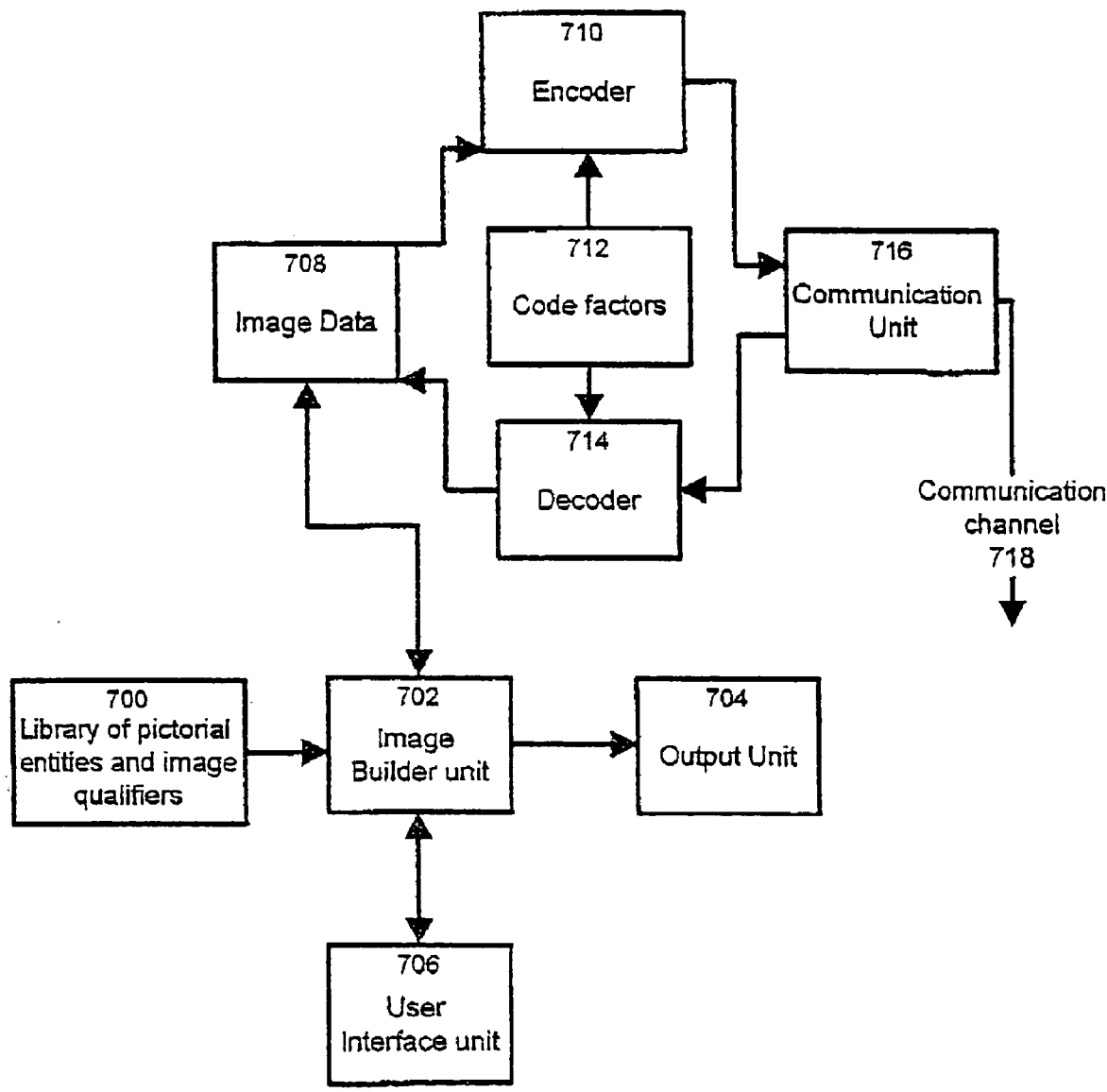
FIG. 7 shows an alternative apparatus including an embodiment of the invention.

FIG. 7 shows an alternative embodiment of an apparatus including an embodiment of the invention. Such an apparatus comprises a user interface 706 such as a touch screen, mouse, keyboard are any other suitable input means for communicating with the user of the image system. The user interface communicates with an image builder unit 702 operative to generate graphical data on the basis of a given set of input data elements. The image builder unit may be implements on a general purpose computing platform running an application software of may be a dedicated CPU unit programmed specifically for the purpose of generating images. The Image builder unit 702 communicates with an output unit 704 such as a display unit or a printer unit to send the generated graphical data for output to the user. The image builder unit also communicates with a library of pictorial entities and image qualifiers 700. The Library of pictorial entities and image qualifiers 700 may be implemented on a computer readable medium such as a hard disk, CD-ROM, non-volatile RAM or any other suitable device. The image builder unit 708 also communicates with a computer readable medium including image data 708. The image data specifies the pictorial entities that are active in the given image as well as any other relevant image qualifier such as position and zooming. The image data 708 may also be modified by the image builder unit 702 to update its entries on the basis of inputs received by the image builder unit 702 from the user through the user interface 706. The image data 708 can be accessed by and encoder 710 operative to encode the image data according to the process described in this specification. The encoder may be implemented on a general purpose computing platform running an application software in accordance with the process described or may be a dedicated CPU unit programmed specifically for the purpose of encoding image data. The encoder 710 outputs the image code. The encoder may further communicate with a communication unit 716 such as a modem, network card or any other suitable communication devices suitable for transmitting data information over a communication channel 718. The image data 708 can be accessed by a decoder 714 operative to decode an image code according to the process described in this specification. The decoder 714 may be implemented on a general purpose computing platform running an application software in accordance with the process described or may be a dedicated CPU unit programmed specifically for the purpose of decoding image codes. The decoder 714 outputs the image data that is inputted to the computer readable medium containing image data. The decoder may further communicate with the communication unit 716 in order to receive image codes. The encoder 710 and decoder 714 also communicate with a computer readable medium including element code factors 712.

Figure 8:
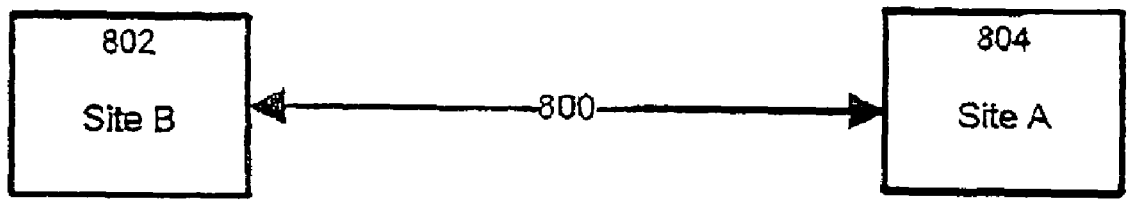
FIG. 8 shows apparatuses including an embodiment of the invention connected by a data transmission medium.

The facial code produced by the process described above allows each facial image to be described with a very small number of characters compared to a graphical representation permitting the rapid transmission of the composite picture over data transmission medium. For example, as shown in FIG. 8, a police station at site A 804 using an embodiment of the invention can transmit the entire composite picture of a suspect to police station at site B 802 by simply sending the facial code for that facial image either verbally or through an electronic communication means 800. At the reception, police station at site B 800 enters the code into the composite picture system that displays the composite picture. The data transmission medium 800 between site A 802 and site B 804 may be a telephone line with a set of modems, and Ethernet connection, the Internet or any other communication medium suitable for the transfer of data. In the above example, site A 804 and site B 802 have on their local site a composite picture system of the type described in FIG. 1 or FIG. 7 of the drawings. A copy of the library of pictorial entities and image qualifiers is stored at each site and only the code needs to be transferred. Advantageously, the invention further allows the storage of a facial image by storing the facial code only on a computer readable medium. This may result in substantial savings in terms of memory requirements for storing the images since only a single instance of each pictorial entity and image qualifier needs be stored, the instance being in the library of pictorial entities and image qualifiers.

Although the present invention has been described in considerable detail with reference to certain preferred versions thereof, other versions are possible. For example, the method and apparatus described may be used in a system to encode a given image provided the image is build on the basis of constituent parts. In these types of application the library of pictorial entities and image qualifiers would include the appropriate set of pictorial entities and image qualifiers. Therefore, the spirit and scope of the appended claims should not be limited to the description of the preferred versions contained herein.

The reader's attention is directed to all papers and documents which are filed concurrently with or previous to this specification in connection with this application and which are open to public inspection with this specification, and the contents of all such papers and documents are incorporated herein by reference.

What is claimed:

1. A method, comprising:
    forming a morphological image using a database of pictorial entities; and
    creating element codes corresponding to said morphological image, each of the element codes based on:
    (a) a symbol representative of a facial feature, the symbol having one of a plurality of values indicative of variations of the facial feature, and
    (b) a first code factor having a value that equals or exceeds a maximum value of the plurality of values indicative of the variations of the facial feature;
    wherein the element codes are combined to form a facial code representing the morphological image.

2. The method of claim 1, wherein said forming said morphological image comprises: selecting combinations of pictorial entities.

3. The method of claim 1, wherein said database of pictorial entities comprises: a library of facial images.

4. The method of claim 1, wherein said facial feature includes at least one of eyes, noise, wrinkles, mouth, ears, hair hairstyle, facial shape, chin, or facial hair.

5. The method of claim 1, wherein said facial feature includes at least one of eyeglasses, jewelry, or head wear.

6. The method of claim 1, wherein said database of pictorial entities comprises: a library of image qualifiers.

7. The method of claim 6, wherein said library of image qualifiers comprises visual effects applied to an image.

8. The method of claim 7, wherein said visual effects comprise enlarging, detracting, positioning, or coloring.

9. A computer software product that includes a medium readable by a processor, the medium having stored thereon:
    an image information of a plurality of elements;
    a qualifier information of a plurality of spatial relationships between said plurality of elements; and
    a sequence of instructions which, when executed by said processor, causes said processor to connect at least one element to at least one spatial relationship, wherein said sequence of instructions includes, as an attribute, combining at least other element with at least one other spatial relationship with said at least one element and at least one spatial relationship, wherein said combining comprises creating element codes corresponding to a morphological image.

10. The computer software product of claim 9, wherein the sequence of instructions forms an image based on first element and a corresponding first spatial relationship.

11. A computer-readable medium having stored thereon a plurality of sequences of instructions, said plurality of sequences of instructions including sequences of instruction which, when executed by a processor, cause said processor to perform the steps of:
receiving a predetermined selection of either an element from image information or a spatial relationship from qualifier information;
obtaining link information corresponding to a selected element or spatial relationship, wherein the link information includes a user's selection as an attribute of the link information;
displaying elements linked with a selected spatial relationship in sequence according to the user's selection using the link information, if an element is selected for browsing; and
displaying spatial relationships which describe elements linked with a selected spatial relationship in sequence according to the user's selection using the link information, if a spatial relationship is selected, wherein said displaying element and displaying spatial relationship includes creating and displaying element codes.

12. The method of claim 1, wherein the symbol in each element code corresponds to at least one pictorial entity in the database.

13. The method of claim 12, wherein the element codes are created as a user selects pictorial entities from the database when forming the morphological image.

14. The method of claim 12, wherein the element codes are created after a user selects all of the pictorial entities from the database included in the morphological image.

15. The method of claim 1, wherein each of the element codes further includes:
an image qualifier having one of a plurality of values indicative of variations of a position of the facial feature in the facial image; and
a second code factor having a value that equals or exceeds a maximum value of the plurality of values indicative of the variations of the position of the facial feature in the facial image.

16. The method of claim 1, wherein the facial image code includes information indicative of a version number of a program used to perform one or more operations of the method.

17. The method of claim 1, wherein the facial image code includes letters corresponding to the at least one symbol and the first code factor.

18. The method of claim 1, wherein the facial image code includes non-alphanumeric characters substituted for visually confusing alphanumeric characters.

19. A method for encoding a digital representation of a face, comprising:
(a) multiplying a facial code by a first code factor corresponding to a pictorial entity representing a facial feature, the first code factor having a value that equals or exceeds a maximum value of a plurality of values indicative of variations of the facial feature;
(b) adding a value of a symbol corresponding to the pictorial entity to the facial code;
(c) repeating (a) and (b) for one or more additional pictorial entities, each corresponding to a different facial feature;
(d) combining results of (a)–(c) to form a facial code that corresponds to the digital representation of the face; and
(e) storing the facial code in a database for subsequent retrieval.

20. The method of claim 19, wherein the pictorial entity symbol corresponds to one of the plurality of values indicative of variations of the facial feature and is less than said maximum value.

21. The method of claim 19, further comprising after (b):
identifying an additional symbol corresponding to the facial feature and related to the pictorial entity;
multiplying the facial code by a second code factor corresponding to the additional symbol, the second code factor having a value that equals or exceeds a maximum value of a plurality of values indicative of variations of the pictorial entity; and
adding a value corresponding to the additional symbol to the facial code.

22. The method of claim 21, wherein the additional symbol is an image qualifier symbol indicating a position of the facial feature represented by the pictorial entity in the digital representation of the face.

23. The method of claim 1, further comprising:
communicating the facial code to a remote processing system, which generates the morphological image for display based on the facial code.

24. The method of claim 23, wherein the facial code is transmitted through a network to the remote processing system.

* * * * *